INVENTOR:
BRADLEY C. DOUGLAS
BY Kingsland, Rogers, Ezell, Eilers & Robbins
ATTORNEYS INVENTOR:
BRADLEY C. DOUGLAS
BY Kingsland, Rogers, Ezell, Eilers & Robbins
ATTORNEYS

United States Patent Office 3,452,929
Patented July 1, 1969

3,452,929
TEMPERATURE PILOTED EVAPORATOR PRESSURE CONTROL
Bradley C. Douglas, Kirkwood, Mo., assignor to Alco Controls Corporation, Creve Coeur, Mo., a corporation of Missouri
Filed Sept. 21, 1967, Ser. No. 669,568
Int. Cl. F16k *31/12;* G05d *7/03*
U.S. Cl. 236—80         8 Claims

ABSTRACT OF THE DISCLOSURE

The subject matter of the present disclosure is a piloted evaporator pressure control, used in a refrigerant pipe between the evaporator and compressor, having a main valve modulated to control the flow of refirgerant to the compressor as a function of air temperature across the evaporator or in the area to be cooled. The main valve is pilot operated, the pilot valve being movable and modulated between a first or maximum open position in which flow is at a maximum to the main valve piston, so the main valve is widest open, and a second position wherein flow is cut off to the piston and the main valve is closed. Such movement is produced by a spring, acting against a contracting bellows that is part of a thermostatic liquid system including a sensing bulb. Expansion of the thermostatic liquid expands the bellows and produces the opposite movement of pilot and main valve, against the spring. The pilot valve has a third position beyond the closing position to which it can be driven by the spring if the thermostatic liquid is lost and the bellows contracts abnormally beyond its usual minimum size permitted by normal contraction of the liquid. In this third pilot valve position, a special different passageway is provided to admit pressure to the main valve piston to cause the main valve to open. Thus the failure of the thermostatic system by loss of liquid cannot result in closing off of the refrigeration.

*Summary of the invention*

This invention is thus in the field of pressure-operated pilot valves, and specifically of thermostatically operated controls, and most especially compressor suction line controls, and particularly of refrigeration valves having failsafe arrangements.

In summary of the present invention, its particular feature is its ability to modulate the position of a main refrigerant valve in accordance with temperature condition, and, in the event of failure of the hydraulic system, immediately to shift to a position to provide refrigeration and to remain there until repair is effected. The advantages of this in food display cases and the like should be apparent. The apparatus may be used in other connections, and so in another sense a particular feature of the invention is to provide a valve apparatus controlled by a fluid system that normally closes upon contraction of a pressure liquid, but which has an opening means operated when the pressure liquid is lost. Other features include the assembly of the parts for ease of assembly and servicing.

Figure 1:
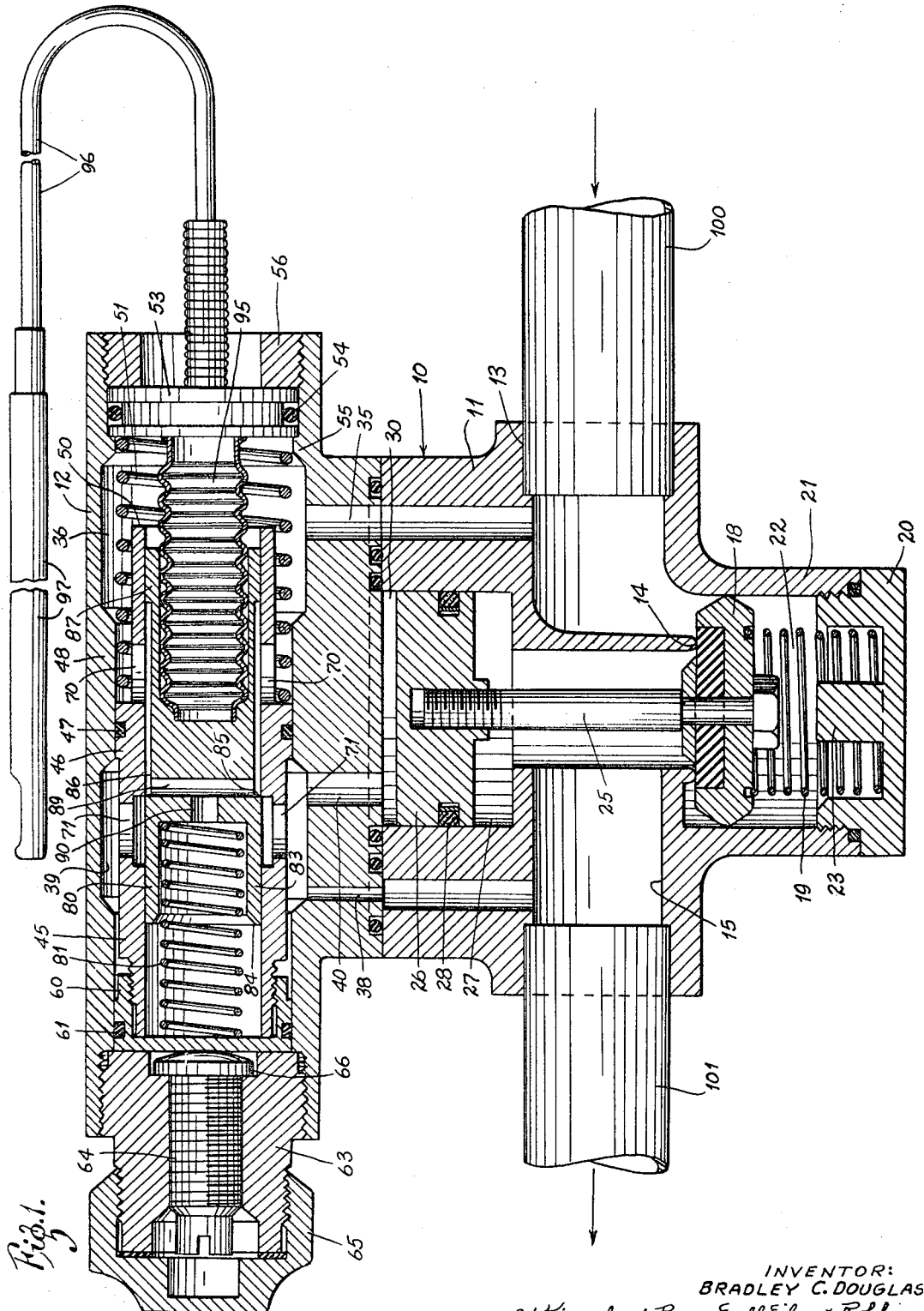
FIGURE 1 is a diametrical sectional view through the valve apparatus at a point of incipient modulation of the main valve position.

The valve apparatus includes a housing generally indicated at 10. It is shown here as consisting of a main valve housing 11 and a pilot valve housing 12, secured and sealed together by appropriate means not shown.

The main valve housing 10 has an inlet 13, leading to a valve seat 14, through an appropriate partition. The valve seat 14 then leads to an outlet 15.

A main valve 18 is adapted to move toward and from the seat 14. The main valve is urged by a spring 19 toward the seat 14. The spring 19 acts between the main valve and a cap 20 threaded into a circular valve-receiving neck 21 projecting from the housing. The cap 20, neck 21, and the valve partition enclose a valve chamber 22. As shown, the valve 18 includes a valve closure member of appropriate, somewhat resilient, material. The valve is guided by the wall of the circular tubular projection 21, and its opening movement is limited by a stop 23 formed in the cap 20.

The valve 18 is mounted upon a valve stem 25 that in turn is securely fitted into a piston 26. This piston reciprocates in a cylinder 27 formed in the main valve housing 11. An O-ring or like sealing means 28 can be provided for the piston. The lower part of the piston 26 is exposed to outlet side pressure, being open to the outlet 15. The upper side of the piston 26 is in a pressure chamber 30 closed by the upper pilot valve housing 12.

The pilot valve housing 12, that is secured to a flat surface on the top of the main valve housing 11, includes a transverse cylindrical opening of different diameters. A high pressure inlet passage 35 in both housing sections 11 and 12 leads from the inlet 13 of the main valve housing to an inlet enlargement 36, or chamber, around the transverse cylindrical opening through the pilot valve body 12. There is a restricted outlet passage 38 also formed in the two housing sections 11 and 12 that connects a low pressure or outlet chamber or enlargement 39 around the transverse opening with the low pressure outlet 15 of the main valve housing member 11. There is also a passage 40 connecting the same outlet enlargement 39 with the pressure chamber 30 above the piston 26.

There is a tubular sleeve that provides a valve partition between the inlet chamber 36 and the outlet chamber 39. This consists of the generally cylindrical sleeve 45, having its medial portion enlarged in diameter, as shown at 46, and grooved to receive an O-ring 47 so that it can be sealingly, but removably, arranged within the transverse opening between the two chambers 36 and 39. It engages against what amounts to an intermediate land 48. The sleeve has a guide projection 50 to the right of the sealing portion 46 and of a smaller diameter than that portion. A relatively strong coil spring 51 surrounds the projection 50 and acts against the shoulder at the base thereof to urge the sleeve 45 to the left. The spring 51 abuts at its right end against a circular bellows head 53 flanged to contain an O-ring 54. The bellows head seats against an inwardly projecting flange 55 formed in the valve housing 12 and is also secured in place by a threaded nut 56 secured into the right-hand end of the transverse passage.

The spring 51 urges the sleeve 45 to the left. At its leftmost end the sleeve 45 is threaded into a cap 60 having internal threads engaging over the end of the sleeve. This cap is slidable within the transverse opening and has an O-ring 61 for sealing purposes, and is, in turn, held against an adjusting device secured in the left end of the transverse opening.

This adjusting device has a plug 63 threaded into the end of the transverse opening in the pilot valve housing 12. An adjusting screw 64 is threaded through the plug 63 and kerfed at its left end so that it can be appropriately adjusted. A dust and protective cap 65 is threaded over the end of the plug 63 as shown. The screw 64 has an enlarged abutment end 66 with a somewhat domed surface that engages against the left-hand surface of the cap 60. The leftward movement of the cap 60, and therefore of the sleeve 45, under the influence of the spring 51, is ultimately limited by the plug 63. However, the screw 64 can be adjusted to move the cap 60 and the sleeve 45 to the right against the spring.

The sleeve 45 has a series of holes 70 around its periphery through its projection 50, in permanent communication with the inlet chamber 36, and the inlet 35, and connecting the inlet with the interior of the sleeve. There are also a series of outlet holes 71 arranged around the sleeve 45 adjacent the outlet enlargement or chamber 39 of the transverse passage. They are the control openings of the pilot valve arrangement.

The pilot valve is a cylindrical sleeve valve 80 that reciprocates from end to end within the sleeve 45. It is yieldingly urged to the right in the drawings by a coil spring 81. The spring 81 constitutes a yieldable force means that engages at its left end against the inner surface of the cap 60, and it its right end is received in a recess in the left end of the slide valve 80.

The slide valve 80, at its left end, is slidably engaged in a piston-like manner within the sleeve and its left end forms a skirt 83 that constitutes the valving portion of the pilot valve. It has a fail-safe valving edge 84 at its left end and a normal modulating valving edge 85 at its right end.

The right end of the valve 80 has a portion 86 of reduced diameter, to provide the valving shoulder 85 and designed to be in constant communication through the port 70 of the extension 50 of the sleeve 45 with the inlet chamber 36 and inlet 35. Beyond and to the right of the reduced portion 86, the valve has a larger portion 87 that is in slidable contact with the right end 50 of the sleeve and is guided thereby.

The foregoing reduced portion 86 of the valve 80 communicates with a cross passage 89 through the valve that communicates with an axial passage 90 opening to the interior of the sleeve 45 to the left of the slide or piston valve 80. While this conducts inlet pressure to the left of the pilot valve, such pressure is normally cut off from the outlet 71 by the skirt 83 of the valve.

As is evident, the pilot valve is constantly urged to the left by the spring 81. At its other end the valve is acted upon by a pressure mechanism including an expansible bellows 95, the closed end of which seats in a socket in the piston valve. The right end of the bellows is sealed into the cap 53. A tube 96 leads from the cap 53 to a sensing bulb 97. An appropriate thermal liquid is contained within the bulb 97, the tube 96, and the bellows 95, to provide for expansion and contraction of the bellows. Consequently, the bellows can move the piston to the left against the spring 81 or can withdraw and permit the spring 81 to move the piston to the right in the drawings.

The operation of the device is as follows:

As stated, the inlet 13 is connected normally to a pipe 100 leading from the evaporator of a refrigeration system. The outlet 15 is connected to another pipe 101 leading to the suction side of the compressor of the system. When the system is inactive, the main valve 18 is closed against the seat 14. It is urged in a closing direction by the spring 19 and the piston 26 is at this time subjected on both sides to outlet side pressure as appears from FIGURES 1 and 2.

Figure 2:
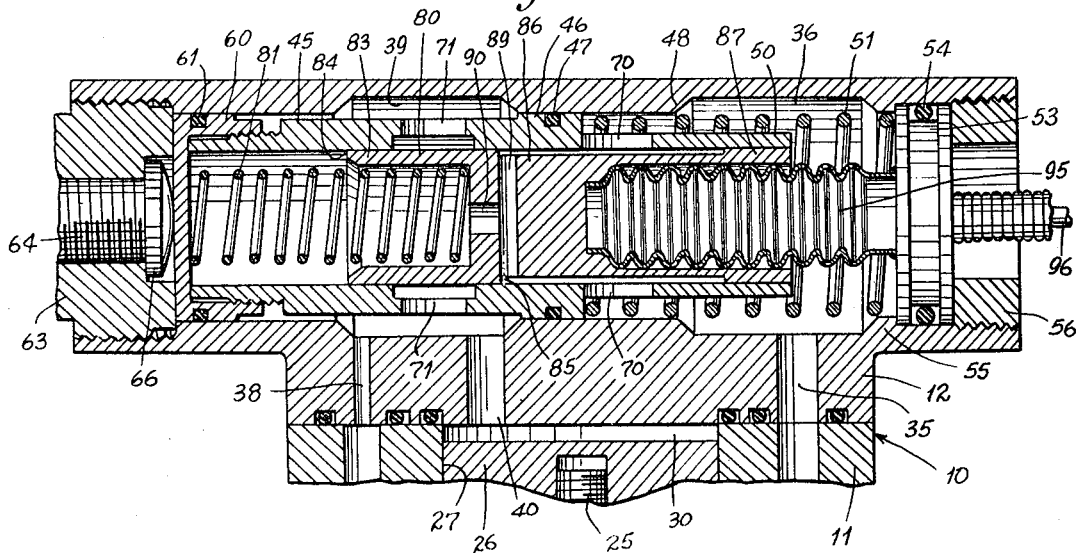
FIGURE 2 is a partial sectional view similar to FIGURE 1 showing the pilot valve arrangement with the main valve closed.

In FIGURE 2, the bellows 95 is contracted, the spring 81 having moved the valve 80 to the right until the valving edge 85 on the piston has passed from the valve port 71 so that the sleeve 83 of the valve has closed the port 71 entirely. With this condition, inlet pressure is in the inlet chamber or enlargement 36, the cutaway recess 86, the cross passage 89, and the axial passage 90, so that it is on both sides of the piston valve 80. It surrounds the bellows 95. However, it is cut off from the outlet restricted passage 38 and the passage 40 to the piston chamber 30.

In the foregoing condition the piston 26 and the main valve 18 are in their uppermost positions under the influence of the spring 19, and the pressure difference on opposite sides of the valve. The valve 18 does not seal within the cylindrical projection 21.

In FIGURE 1 the fluid within the bulb 97 has expanded to such a point that the valve is just about to open. In this action the expanding bellows 95 has moved the valve 80 against the spring 81 to bring the shoulder 85 to the right-hand edge of the passage 71. Any further additional movement will admit inlet pressure through the passage or port 71 to the downstream enlargement or outlet chamber 39 of the transverse passage to the restricted outlet 38 and to the passage 40 to the pressure chamber 30 above the piston. When the rate of inflow to the pressure chamber 30 exceeds the rate of outflow through the restricted passage 38, pressure will increase in the piston chamber 30 above the piston 26 until it displaces that piston downwardly against the spring 19. As soon as this occurs, the main valve 18 will open somewhat. This action, of course, increases the low side pressure and reduces the flow across the valve shoulder 85. Equilibrium will be established in the known manner with the main valve 18 in a position that produces a pressure balance between the inlet and outlet that corresponds to each position of the pilot valve. In this manner, the main valve, as well as the pilot valve, responds to the temperature and pressure conditions of the thermal liquid system of the bulb 97.

If the thermostatic fluid leaks so that it is partly or wholly lost, the bellows 95 will be compressed under the influence of the spring 81 until it is reduced to below its normal minimum size determined by the maximum compressibility of the fluid within the thermostatic bulb system. In other words, the thermostatic bulb system normally contains enough fluid to prevent the compression of the bellows 95 to a point such that the skirt 83 of the piston valve can move to dispose its left-hand valving edge 84 into the opening or port 71. Where the thermostatic fluid is a liquid at all times during the cycling of the device, it is readily apparent how this can be accomplished. With a volatile fluid, it is necessary to choose a liquid having a vapor pressure such that at the normal operating ranges the bellows will always be expanded sufficiently to prevent the skirt 83 from exposing the port 71.

Figure 3:
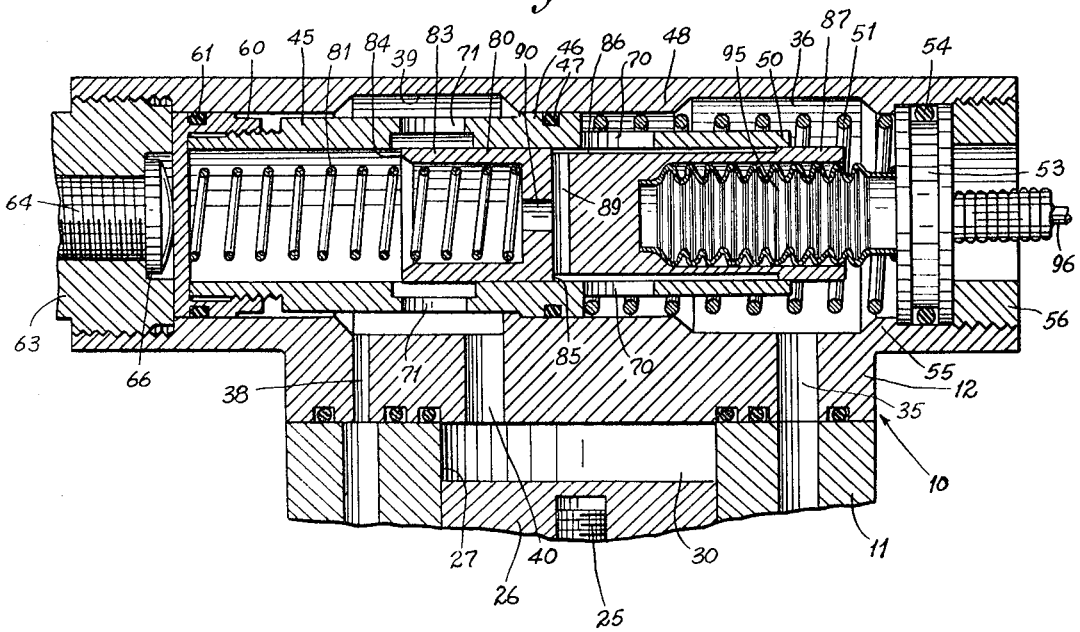
FIGURE 3 is a view similar to FIGURE 2, but with the pilot valve open in its fail-safe position.

As heretofore noted, at all times inlet pressure is on both ends of the pilot valve 80. Accordingly, in the situation of FIGURE 3, inlet or high pressure is admitted past the left end 84 of the skirt 83, through the port 71, to the pressure chamber 30. The port is open sufficiently far that this pressure will always maintain the main valve open. While this may mean that an excess refrigeration over the desirable quantity is supplied, nevertheless it will keep the refrigerator chilled so that the food or other products therein will not be spoiled. It will become apparent to the operator that the valve is not operating properly when it continues in this maximum cold-producing situation without modulating.

It will be seen that with the present arrangement the inlet side pressure acts with the spring 81 against the internal pressure of the bellows. A rise in evaporator pressure can move the pilot and main valves toward closed positions. However, with a so-called solid charge (i.e., non-vaporizing) this is of no effect.

When it is desired to adjust the temperature at which the valve will produce some predetermined position of the main valve 18, the cap 65 is removed and the screw 64 is turned. This displaces the port 71 within the pilot valve housing 12 so that for a given temperature condition of the bellows 95 the valve passages are opened to a modified degree. In this adjustment, Hooke's Law will provide some change in the force of the spring 81, but this is normally of no effect in a solid charge system.

The foregoing pilot valve arrangement regulates the rate of admission of high pressure fluid into the pressure chamber 30, against a fixed and restricted exhaust passage to the low pressure side. This is the preferred construction, although a complete reversal of the housing 12 and slide valve mechanism mounted therein, with respect to the main valve housing, produces a similar operation to that described. It is known that pilot valve operation can usually be obtained by modulating either high pressure inlet flow relatively to a fixed outlet, or modulating the exhaust outlet flow against a fixed inlet. The essential principle requires regulating a bypass pressure to control pressure on a movable wall disposed in the bypass, to which movable wall a control valve is attached. In either arrangement, the present fail-safe feature can be used. In FIGURE 1, it can be seen that the main valve housing 12 can be detached and turned 180° from its position shown, and reattached. The passages 35 and 38 will still register, though the restriction in the pilot valve housing passage will then be in the inlet. The port 40 will still connect to the chamber 30.

Servicing of this valve mechanism is made easy. If the hydraulic system leaks, it can be replaced as a unit by removal of the nut 56. If the slide valve or its cylinder or sleeve wears so as to leak, either the valve 80 or the sleeve 45, or both, can be replaced upon removal of the plug 63. In such case, the housing 11 does not have to be replaced.

Various changes and modifications may be made within the process of this invention as will be readily apparent to those skilled in the art. Such changes and modifications are within the scope and teaching of this invention as defined by the claims appended hereto.

What is claimed is:

1. In a valve mechanism: a valve housing; a slide valve within the housing; an inlet port and an outlet port opening into and from the housing, respectively; the slide valve being adapted to move over and to throttle one of said ports; means including an expansible and contractible fluid charged means to move the slide valve valve back and forth, contraction of the fluid charged means to its smallest normal size causing the slide valve to close said one port; and the slide valve being movable to an extreme position again uncovering the said one port, when the fluid charged means contracts to an abnormally small size, as by loss of its pressure fluid.

2. In the valve mechanism of claim 1: the slide valve being a pilot valve; a main valve having actuating means including a pressure chamber and a movable wall in the pressure chamber, connected to the main valve to displace the same; the inlet and outlet ports of the pilot valve being connected to the high side and the low side of the main valve.

3. In the valve mechanism of claim 2: the pilot valve controlling flow through the inlet to the outlet, and the pressure chamber being downstream of the pilot valve and in communication with the outlet.

4. In the valve mechanism of claim 1: the slide valve having a slide portion of greater extent in the direction of movement of the slide than the corresponding extent of the port, whereby it can cut off the port; but having a limited such extent whereby it can cross over and reopen the port at its opposite side when it moves to its extreme position aforesaid.

5. In the valve mechanism of claim 2: the pilot valve having a slide portion of greater extent in the direction of movement of the slide than the corresponding extent of the port, whereby it can cut off the port; but having a limited such extent whereby it can cross over and reopen the port at its opposite side when it moves to its extreme position aforesaid.

6. In a valve mechanism: a main valve housing and a pilot valve housing separably connected together; the main valve housing having a high pressure inlet, a low pressure outlet and a ported partition therebetween; a main valve movable toward and from the port; a cylinder and piston slidable therein, the piston being connected to operate the main valve; the two valve housings having an interface whereat they are connected; the cylinder communicating to the interface; a high pressure passage part from the inlet to the interface and a low pressure passage part from the outlet to the interface; the pilot valve housing having a transverse opening therein, and high pressure and low pressure passages from the transverse passage to the interface, one being restricted relative to the other, and a pressure chamber passage from the transverse passage to the interface for communication with the pressure chamber when the pilot valve housing connects its high and low pressure passages to the inlet and outlet of the main valve housing, and vice versa; a pilot slide valve in the transverse opening slidable to throttle and to close communication between the high and low pressure passages; means for moving the pilot valve including a hydraulically operated bellows and an opposing spring; the slide valve being constructed to close communication between the passages upon normal contraction of the bellows to its normal minimum permitted by its hydraulic liquid, but to reopen communication when the bellows abnormally further contracts upon loss of liquid by failure; the positioning of the passages communicating into the interface permitting the pilot valve housing to be connected to the main valve housing for the pilot valve to modulate either the incoming fluid to the pressure chamber or the outgoing fluid therefrom.

7. In a valve mechanism: a valve housing having an opening therethrough; an inlet passage and an outlet passage in the housing, one being constricted relatively to the other; the two passages connecting into the opening; a sleeve in the opening insertable from one end thereof, the sleeve being sealed to the walls of the opening between the inlet and the outlet passage, the sleeve having a control port communicating with one of the housing passages; a slide valve in the sleeve having a valving portion of longitudinal extent at least substantially as great as the corresponding extent of the control port whereby it can slide over the same and effectively cut it off; passage means through the slide valve to conduit fluid to both ends of it; means to displace the valve longitudinally back and forth including yieldable force means acting in one direction and a fluid pressure operated expansion and contraction device operating in the opposite direction upon expansion, and in the same direction upon contraction, the normal contractions to smallest size disposing the valve in position to close the control port, and further contraction, under abnormal conditions, causing the slide valve to operate a greater distance and open the other side of the control port.

8. In the valve mechanism of claim 7: adjusting means to displace the sleeve in the housing axially of the opening and relatively to any given position of the slide valve, whereby to adjust the condition at which the means to displace the valve causes the valve to open and cut off the control port.

References Cited

UNITED STATES PATENTS

| 2,401,144 | 5/1946 | Dube | 236—80 |
| 2,584,419 | 2/1952 | Branson | 236—80 |
| 2,593,564 | 4/1952 | Ives | 236—80 |
| 2,917,268 | 12/1959 | Soderbery | 236—80 |
| 3,338,518 | 8/1967 | Barbier | 236—80 |

WILLIAM J. WYE, Primary Examiner.

U.S. Cl. X.R.

62—217, 225; 236—68